H. C. STANTON.
COMBINED PLANTER AND FERTILIZER DISTRIBUTER.
APPLICATION FILED JUNE 23, 1911.

1,132,401.

Patented Mar. 16, 1915.
2 SHEETS—SHEET 1.

Witnesses
J. Adolph Bishop
C. S. Brown.

Inventor
Hugh C. Stanton
By
Foster, Freeman, Watson & Coit
Attorneys

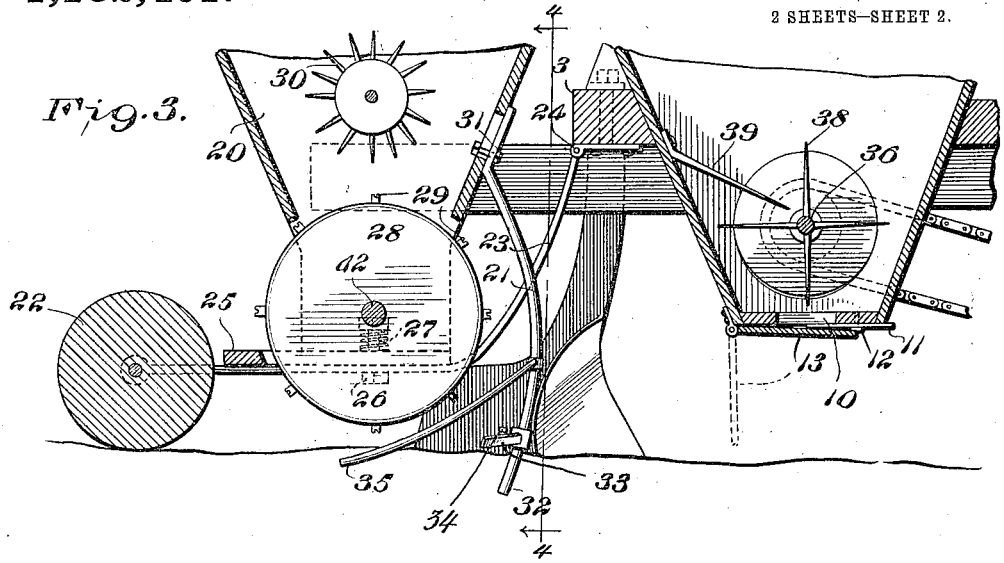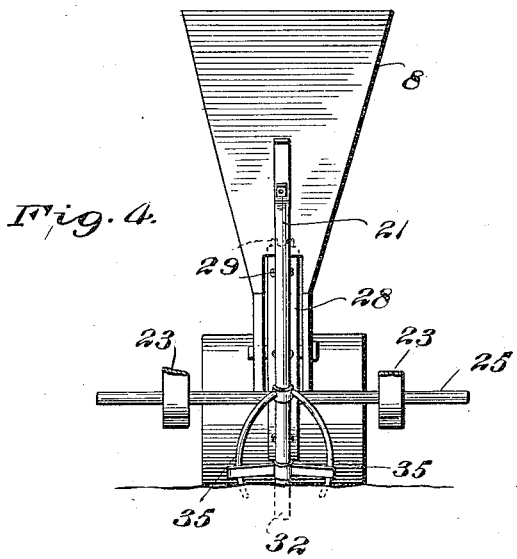

UNITED STATES PATENT OFFICE.

HUGH C. STANTON, OF DILLON, SOUTH CAROLINA.

COMBINED PLANTER AND FERTILIZER-DISTRUBUTER.

1,132,401. Specification of Letters Patent. Patented Mar. 16, 1915.

Application filed June 23, 1911. Serial No. 634,995.

*To all whom it may concern:*

Be it known that I, HUGH C. STANTON, a citizen of the United States, and resident of Dillon, in the county of Dillon and State of South Carolina, have invented certain new and useful Improvements in Combined Planters and Fertilizer-Distributers, of which the following is a specification.

It has been my purpose to make a simple, compact, convenient and efficient device which will as a single machine deposit fertilizer, form a ridge covering said fertilizer and plant and cover the seed on that ridge.

It has further been my purpose to make a device which will perform the various functions accurately and with easy and proper control both in depositing the fertilizer and planting the seed. The device was designed primarily for planting cotton seed, but it is of course not limited to that particular use.

The various novel features of the device will be apparent from the following description taken in connection with the drawings.

Figure 1:
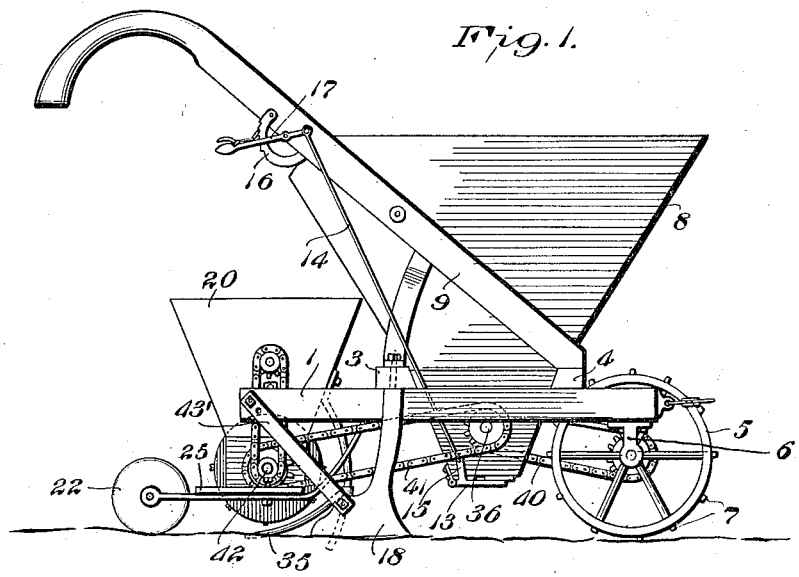
Figure 2:
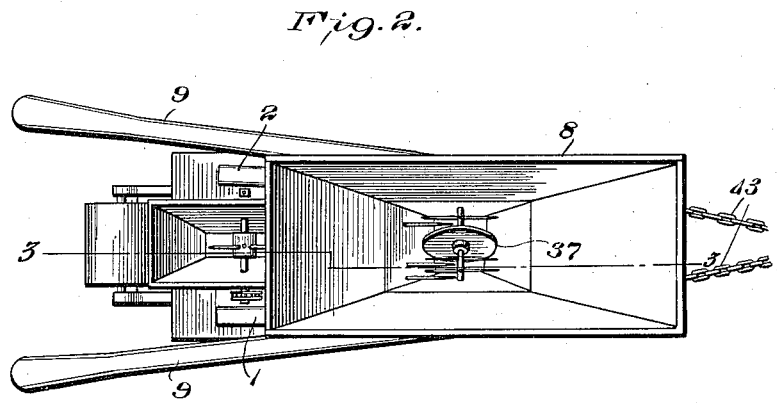

In the drawings: Figure 1 is a side elevation of a machine embodying my invention; Fig. 2 is a plan view; Fig. 3 is a longitudinal section of a portion of the machine enlarged showing the feeding and planting mechanisms taken on the line 3—3 of Fig. 2; and Fig. 4 is a partial section through the machine looking toward the seed planting mechanism taken on the line 4—4 of Fig. 3.

As shown in these drawings I make use of a main frame embodying side bars 1 and 2 and connecting cross bars 3 and 4, this frame being mounted at its forward end on a wheel 5 by means of the depending bearings 6. The power for operating the parts of the machine is derived from this wheel 5 as it is pulled forward, and to prevent it from slipping and to enable it to transmit the power it is preferably provided with ribs or projections 7. Mounted on the main frame and discharging immediately behind the wheel 5 there is a fertilizer hopper 8 securely fastened to the frame. This hopper will be made of convenient size to carry the proper amount of fertilizer, and the handles 9, by which the person using the machine controls its movement, are fastened to the side of the hopper and to the frame. This hopper has an opening 10 at the center of the bottom plate and the size of this opening may be controlled by a sliding plate 11 adjustably held in place by a screw 12 so that the amount of fertilizer deposited per acre may be accurately controlled. In addition to the control plate 11 I also hinge at the rear edge of the bottom of the hopper a plate 13 which may be turned up to the position shown in full lines in Figs. 1 and 3 to entirely close the fertilizer outlet, but which may, if desired, hang down in the position shown in dotted lines in Fig. 3 so as to permit the fertilizer to be deposited in front of it. It will be observed that the fertilizer falls in front of the plate 13 and that it may swing so that if it strikes an obstruction it will turn to the rear out of the way. This hinged plate may be controlled by any suitable means which should be accessible to the person operating the machine and as shown in Fig. 1 there is a connection 14 from an arm 15 on the plate leading to a point on the handle 9 accessible to the driver of the machine. A segment 16 and an arm 17 provided with a catch engaging the segment may be used for holding the hinged plate in position. Immediately behind the discharge opening for the fertilizer and secured to the side bars 1 and 2 are plows 18 adapted to enter the earth and turn it to form a ridge covering the fertilizer which has been deposited. I have shown the earth turning means as consisting in what are known as turn plows, the plows being on opposite sides of the machine and facing in opposite directions so as to both turn the earth toward the center line of the machine. It will be understood, however, that any suitable earth turning means may be used.

Immediately in the rear of the earth turning means I make use of a supplemental frame hinged to the main frame and carrying a seed hopper 20, a furrow opener 21 and a smoothing roller 22. This supplemental frame consists of two spring arms 23 hinged at 24 to the cross bar 3 and supporting in a horizontal position the cross board 25 which carries the seed hopper. The arms 23 are preferably flat steel bars and at their rear free ends they carry bearings receiving the end spindles of the roller 22. The plate 25 is secured to the bars 23 by means of bolts 26 which pass through the plate 25 and the bars and which are provided with coil springs 27 above the cross board for properly holding it in place on the arms. The hopper 20 is rigidly secured to the board 25 and has in its bottom a wheel 28 which is comparatively narrow and which extends longitudinally of the machine. This wheel extends into the bottom of the seed hopper and through the plate 25 and has at intervals across its periphery means for engaging seed and carrying them from the inside of the hopper to the outside where they are dropped into the furrow formed by the furrow opener 21. I prefer to make this wheel 28 with a series of rows of holes transversely and to insert pins or screws 29 in those holes for the purpose of engaging the seed and feeding them. The pins or screws are removable and therefore I can place them either in rows across the wheel or in staggered relation around the circumference, whereby the seed may be fed either at intervals to form separated hills or may be fed continuously. Suitable mechanism 30 may be placed in the seed hopper above the feed wheel for the purpose of agitating the seed and keeping them in proper condition to be fed, this device being shown in the shape of a cylinder having spikes extending therefrom radially.

The furrow opener 21 is secured to the forward side of the seed hopper 20 by means of a bolt 31, and it will be understood that the said opener may be adjusted vertically so as to vary the depth to which it enters the ground. The lower end 32 of the opener is curved to the rear as usual, and above this lower end I secure the arms or wings 33 extending laterally therefrom and inclining slightly to the rear, the purpose of these wings being to level the ground at the side of the furrows and to prevent the dirt from falling back into the furrows. These arms or wings are adjustably secured to the furrow opener, whereby the depth of the furrow can be regulated, and in the drawing this adjusting means includes a set screw 34. It will be observed that the seed falls in the furrow immediately behind the furrow opener and covering arms or fingers 35 extend from the opener around to the rear behind the point where the seed falls. These covering arms enter the ground and turn the dirt to cover the seed in the furrow. The roller 22 levels the ridge behind the machine and completes the covering of the seed, and this roller supports the rear end of the supplemental hinge frame. The hinged arrangement of the frame and its support from the roller 22 makes it possible to regulate with accuracy the action of the furrow opener and of the seed feeding mechanism so that the seed will always be planted at the proper depth without regard to the nature of the particular soil where the machine is operated. In other words where the plows or earth turning means do not raise a high ridge owing to the nature of the soil, the furrow opener will automatically sink down to the point where it will make a furrow of the proper depth and the seed will be properly planted, whereas if it were attached to the main fixed frame the seed might be planted at different depths for soils of different kinds.

The means for feeding the fertilizer from the hopper 8 consists of a shaft 36 having thereon at the center a disk 37 mounted at an angle on the shaft, whereby its outer edge reaching down practically to the outlet opening 10 will in rotating move back and forth across the opening 10. By this motion the fertilizer will be fed across the opening and will be uniformly discharged therefrom. In order to agitate the fertilizer and break up large lumps I make use of spikes or fingers 38 extending radially from the shaft 36 at intervals on opposite sides of the disk. These spikes are so arranged as to pass between the fixed spikes 39 secured to the inner wall of the fertilizer hopper and extending downwardly at an angle to a point immediately above the shaft, the fingers or spikes 38 it will be seen turning in such a way as to pass upwardly between the spikes 39 so that the lumps will be caught under the inclined spikes 39 and crushed. It will be observed by reference to Fig. 1 that the wheel 5 has a sprocket over which the chain 40 works passing over a sprocket wheel on the shaft 36. A second chain 41 connects the shaft 36 with the shaft 42 of the feed wheel 28 and if desired a belt tightener may be used on this chain connection so as to keep it tight. A chain also connects the shaft 42 and the agitator 30 so that when the machine goes forward and the wheel 5 turns the various feeding mechanisms will also be turned.

It will be understood that the apparatus is to be moved forward in any suitable way and I have shown chains 43 at the forward end of the machine to which the draft animal may be connected in the well known way.

The longitudinal inclination of the plows 18 may be regulated by adjusting the brace 43' so that these plows will enter the ground to different depths, as may be desired.

Having thus described my invention what I claim as new and desire to secure by Letters-Patent is:

1. In a seed planter, the combination with a seed hopper having a discharge outlet at the bottom, of a furrow opener mounted in advance of said hopper, vertically adjustable leveling wings extending laterally from said furrow opener above its bottom to level the earth at the sides and to secure a uniform furrow, and covering arms projecting from said furrow opener around said discharge outlet and adapted to enter the ground at the rear of said outlet and to turn the earth to cover the seed deposited in the furrow.

2. In a device of the class described, the combination with a frame, of rearwardly extending arms hinged thereto so as to permit vertical motion, a roller connecting said arms at their rear ends, a seed hopper carried by said arms in advance of said roller, and a furrow opener adjustably secured to the front side of said hopper.

In testimony whereof I affix my signature in presence of two witnesses.

HUGH C. STANTON.

Witnesses:
J. E. CATTINGHAM,
R. W. FENEGAN.

Copies of this patent may be obtained for five cents each, by addressing the "Commissioner of Patents, Washington, D. C."